Oct. 27, 1964
F. L. BROWNE
3,154,632
RIGID CONDUIT EXPANSION JOINT GROUNDED TO
REQUIRE NO EXTERNAL BONDING JUMPER
Filed Feb. 1, 1962
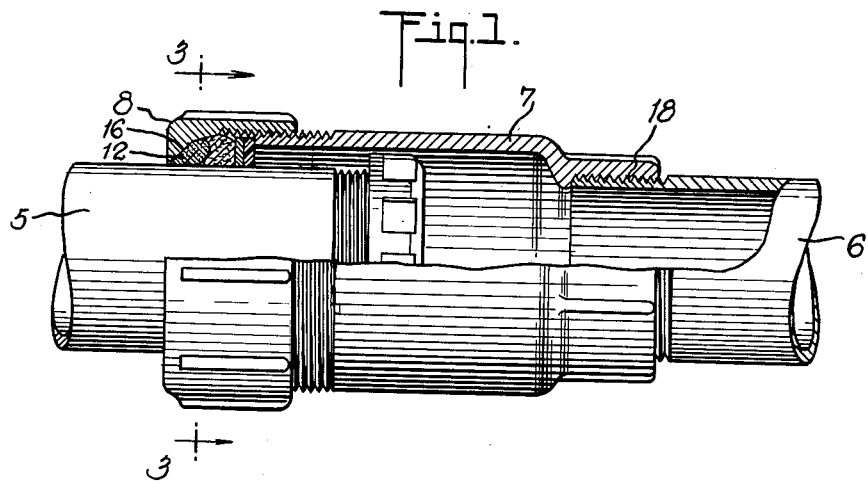
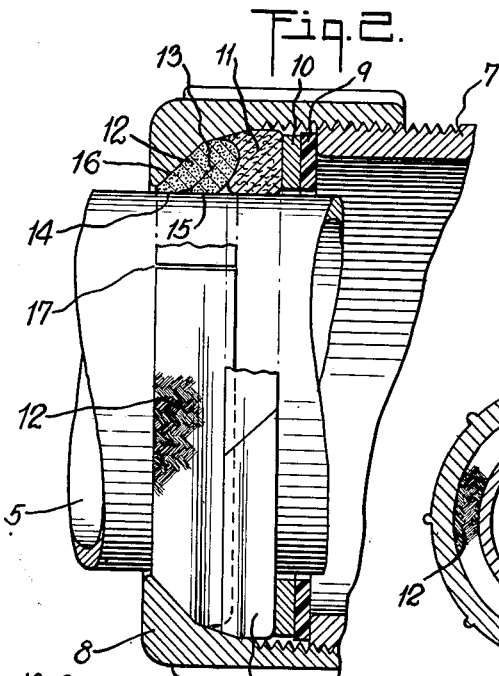
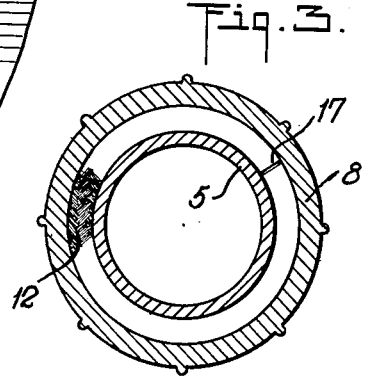
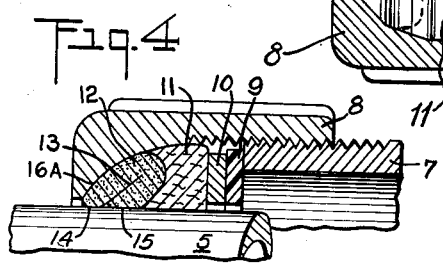
INVENTOR.
FRANK L. BROWNE
BY Philip S. McBean
ATTORNEY

United States Patent Office 3,154,632
Patented Oct. 27, 1964

3,154,632
RIGID CONDUIT EXPANSION JOINT GROUNDED TO REQUIRE NO EXTERNAL BONDING JUMPER
Frank L. Browne, Wantagh, N.Y., assignor to O. Z. Electrical Manufacturing Co., Inc., Brooklyn, N.Y., a corporation of New York
Filed Feb. 1, 1962, Ser. No. 170,338
2 Claims. (Cl. 174—86)

The invention herein disclosed relates to expansion joints for lines of rigid conduit.

Expansion joints of this character have usually required the use of external bonding jumpers about the joints.

Objects of the present invention are to obviate the need for such external bonding jumpers and to accomplish this in a simple, practical form of construction.

This has been accomplished by the use of a grounding ring of tinned copper braid compressively held in the expansion head of the joint and folded longitudinally to present the edges of the braid to the sliding section of the conduit enclosed within the joint.

Other desirable objects accomplished by the invention and further novel features of construction through which such objects are attained are set forth or will appear in the course of the following specification.

The drawing accompanying and forming part of the specification illustrates present preferred embodiments of the invention but structure may be modified and changed as regards this illustration, all within the true intent and scope of the invention as hereinafter defined and claimed.

FIG. 1 in the drawing is a broken and part longitudinal sectional view of one of the internally grounded expansion joints as installed in a line of rigid conduit.

FIG. 2 is a broken sectional view of the parts on a larger scale.

FIG. 3 is a cross sectional view on substantially the plane of line 3—3 of FIG. 1.

FIG. 4 is a broken sectional detail illustrating a modification of the invention.

In FIG. 1 opposing end sections of conduit which are to be connected by an expansion joint are indicated at 5 and 6.

The body of the joint is designated 7 and is shown screwed onto the conduit section 6 at 18.

The head of the expansion joint is shown as a ring 8 surrounding the other conduit section 5 and screwed over the larger end of the body 7.

A weathertight washer 9 is shown held in sealing engagement with the end of the body by a steel washer 10 which is in engagement with a lubricated watertight packing 11 in engagement with conduit 5.

A permanent grounding connection with conduit 5 is made by a ring of tinned copper braid 12, folded down the middle at 13 to present the opposite edge portions 14, 15 of the braid to the conduit.

The doubled outer portion 13 of the braid is engaged by the watertight packing 11 and the folded edges 14, 15 of the braid are wedged in firm bonding engagement with the conduit by the beveled inclined inner wall surface 16 of the confining head.

This braided copper ring 12 may be butt jointed as indicated at 17, FIG. 2, or the ends may be lapped or scarf jointed or this may be a complete endless braided ring.

The important feature is that both edges of the braid are made to bear on the conduit, with the interwoven copper strands which make up the braid forced into positive wiping engagement with the conduit. The multiplicity of copper contacts thus made with the conduit assures a permanent lasting ground, the copper strands operating as brushes permitting sliding movement of the conduit without losing positive electrical connection therewith and exerting a wiping clean effect with the expansion and contracting movements of the conduit. The copper braid thus does not interfere with the intended free movement of the conduit in the expansion joint and being wholly enclosed is protected against injury which might impair its effectiveness.

The permanent character of this grounding connection thus eliminates need for the customary external bonding jumper which heretofore has been bridged across the joint and clamped at its opposite ends to the two sections of conduit. These exposed external jumpers take up space about the joint and are in position to be broken or loosened whereas in the present invention the grounding connection is fully enclosed and protected against injury.

The inclination of the beveled compression wall 16 may vary to best confine and hold the folds of braid engaged with the conduit. This inclined confining wall may be all in one slope or made up of slopes of different inclination as indicated in FIG. 2. Furthermore the inclination may be on a curved or straight line or lines as found best to compact and force the folded or rolled layers of the braid firmly engaged with the conduit where with the expansive and contractive movements they will exert a scraping or scrubbing action on the conduit.

FIG. 4 shows the bevelled compression wall 16A formed on a curve inwardly convergent toward the conduit enclosed therein.

The invention does not increase the size or bulk of the expansion joint and has the further advantage of a low cost improvement.

Washer 9 engaged with the end of the body member seals off that member independently of the screw connection between the body member and expansion head and the compressible packing 11 seals the head to the conduit.

The inwardly beveled end face 16 is readily rotatable over the upper or outermost surface of the folded braid and forces the braid into firm interlocked engagement with the compressible packing, thus to more or less interlock the braid with the packing and assure that these members may remain stationary while the head is being given the final turns necessary to set the braid and the packing down on the conduit.

While generally it may be preferred to fold the braid down the center, as illustrated, the braid in the strip form may be rolled transversely or twisted longitudinally to increase the overall diameter and provide the stranded edges which form the great multiplicity of contact elements spread over the surface of the conduit. All such forms of folded braid have a certain amount of resiliency incorporated in them aiding in forming a permanent bonding connection with the conduit.

What is claimed is:
1. An internally grounded conduit expansion joint for connecting adjoining sections of rigid conduit comprising the combination of
   a body member having screw threads at one end engageable over a screw threaded end of one section of conduit,
   an expansion head surrounding the adjoining section of conduit and having screw connection at one end over the other end of said body member,
   a weathertight washer in sealing engagement with said last mentioned end of the body member for sealing off said body member independently of the screw connection between said body member and expansion head,
   a rigid thrust washer engaged over said sealing washer,
   lubricated watertight compressible packing within said expansion head and held thereby in engagement with said thrust washer and the second mentioned section of conduit, a ring of copper braid surrounding said second section of conduit and folded longitudinally inwardly to present the stranded edges of the braid into contacting engagement with said second section of conduit, said folded braid being in engagement with said compressible packing, and said expansion head having an internal inwardly beveled wall in engagement over said folded braid for compressing the folded portions of said braid together and into engagement with the conduit and for impressing the braid into the compressible packing and the packing on the conduit and the sealing washer into sealing engagement with the body member, all by rotation of the expansion head in its screw connection with the body member.

2. The invention according to claim 1, in which said inwardly bevelled wall of the expansion head is formed on a curve inwardly convergent toward the conduit enclosed therein.

References Cited by the Examiner

UNITED STATES PATENTS

| | | | |
|---|---|---|---|
| 1,601,381 | 9/26 | Thompson | 277—236 |
| 1,788,365 | 1/31 | Anderson | 277—236 |
| 1,999,981 | 4/35 | Ruger | 339—268 |
| 2,468,783 | 5/49 | Schwartz | 174—35.2 |
| 2,727,084 | 12/55 | Schreiber | 174—35.2 |
| 2,800,912 | 7/57 | McCamish | 285—414 |
| 2,816,949 | 12/57 | Curtiss | 174—51 |
| 2,900,436 | 8/59 | Appleton | 174—86 |
| 3,084,945 | 4/63 | Alexander | 277—236 |

FOREIGN PATENTS

| | | |
|---|---|---|
| 487,463 | 6/38 | Great Britain. |
| 774,419 | 5/57 | Great Britain. |

OTHER REFERENCES

Hall: Abstract of application Serial No. 616,923, published March 18, 1952, 656 O.G. 884.

THOMAS F. CALLAGHAN, *Primary Examiner.*

CARL W. TOMLIN, *Examiner.*